United States Patent Office 3,649,683
Patented Mar. 14, 1972

3,649,683
PROCESS FOR PURIFYING TEREPHTHALIC ACID
Maximilien Grunfeld, deceased, late of Lyon, France, by Daniel Gras, legal representative, Paris, and Jean-Marie Bodin, Lyon, France, assignors to Rhone-Poulenc S.A., Paris, France
No Drawing. Filed May 27, 1968, Ser. No. 732,113
Claims priority, application France, May 29, 1967, 108,247
Int. Cl. C07c 51/42
U.S. Cl. 260—525
8 Claims

ABSTRACT OF THE DISCLOSURE

Terephthalic acid is purified, especially from p-formylbenzoic acid, by treatment, in aqueous solution at elevated temperature and pressure, with a halogen.

---

The present invention relates to purifying terephthalic acid.

Terephthalic acid, obtained industrially by oxidising p-xylene, is a starting material in the manufacture of polycondensates, of which the best known is polyethylene terephthalate, which has found numerous applications, especially in the field of synthetic fibres. This textile application calls for monomers of high purity. Unfortunately, industrial terephthalic acid obtained at the present time is contaminated with organic impurities, e.g. p-formyl-benzoic acid, toluic acid and minerals which generally originate from the catalyst system employed in the oxidation of the p-xylene. These impurities have the disadvantage of limiting the polymer chains or of introducing undesirable colourings into the finished product, or both.

Since terephthalic acid is very difficult to purify, it has been proposed first to convert it into an alkyl terephthalate, which is easier to purify, and then, by an interexchange reaction between the alkyl terephthalate and ethylene glycol, to change the pure ester into bis-($\beta$-hydroxyethyl)terephthalate, which is then subjected to polycondensation to form polyethylene terephthalate.

This process gives good results, but it is evident that technically it would be more simple and more economic to obtain the bis($\beta$-hydroxyethyl)terephthalate directly from the terephthalic acid, instead of having to use an additional step.

Numerous processes have already been proposed for the purification of terephthalic acid, based on sublimation, recrystallisation from different solvents, salification followed by oxidation and a reprecipitation with an acid, oxidation with air at high temperature or even with chromic acid or a permanganate in aqueous medium (French Pat. No. 1,137,203).

The present invention provides a new process for purifying terephthalic acid which makes it possible to obtain a very pure acid perfectly suitable for the preparation of yarns and fibres of polyethylene terephthalate by a process involving direct esterification.

The process of the invention consists in subjecting the terephthalic acid, in aqueous solution under pressure at a temperature between 200° C. and 300° C., to the action of a halogen, in the presence or absence of a hydrohalic acid.

The quantity of terephthalic acid used is a function of the solubility in water of this acid at the chosen temperature. As an indication, this quantity is about 5% by weight of the solution at 225° C.

It may be an advantage in certain cases for a quantity of acetic acid, generally below 5% by weight, to be associated with the water.

It is necessary to operate at a temperature at which the solubility of the terephthalic acid in water is already appreciable, in order that the process can be used industrially. In this respect, it is desirable to work at a temperature higher than 200° C., and preferably between 220° C. and 260° C., these latter temperatures corresponding to solubilities of 4% and 18%, respectively.

The purification can be carried out under autogenous pressure, but it is also possible to work at a pressure higher than the vapor pressure of the solution, by using a compressed gas atmosphere. In this latter case, it is preferable to use an additional pressure lower than or equal to 20 bars. For illustrating these conditions, the optimum pressure, when the temperature is 225° C., can be about 30 bars, or about 5 bars above the autogenous pressure.

The aqueous solution of terephthalic acid can optionally contain a hydrohalic acid, such as hydrochloric acid or hydrobromic acid. The use of this acid is not essential for ensuring good purification. Nevertheless, it has been found that, in certain cases, the terephthalic acid obtained is very slightly coloured and that the presence of a hydrohalic acid in the reaction medium suppresses the development of unwanted colour. Consequently, it is generally preferable to carry out the new process in the presence of a hydrohalic acid. The proportion of the latter can vary within fairly wide limits, for example, from 2% to 50%, and preferably 10% to 25%, by weight of the terephthalic acid being purified.

The quantity of halogen added to the reaction medium varies according to the content of impurities, especially p-formyl-benzoic acid, the most important impurity, in the terephthalic acid to be purified. Generally speaking, from 0.01 to 0.25 gram-atom, and preferably 0.025 to 0.125 gram-atom, of halogen per gram of p-formyl-benzoic acid in the terephthalic acid can be used. However, these values only represent an order of magnitude and can be modified to a large degree, depending on circumstances.

The halogen can be added at the beginning of the operation or during the heating, but it is preferable to inject it into the aqueous solution of terephthalic acid, possibly containing hydrohalic acid, brought to the desired pressure and temperature. This injection can be effected with free halogen or halogen in solution, provided that any solvent used does not deleteriously affect the purification by causing side-reactions.

According to another procedure, it is possible to form the halogen in situ. To this end, it is for example possible to inject simultaneously into the reaction mixture containing the terephthalic acid in aqueous solution, the hydrohalic acid corresponding to the selected halogen and also, in the pure state or in aqueous solution, an oxidising agent capable of liberating the halogen from the hydrohalic acid. Suitable such agents include hydrogen peroxide, nitric acid, potassium permanganate and sodium hypochlorite. In another modification, the halogen-generating agent can be directly injected into the aqueous solution of terephthalic acid which contains hydrohalic acid. In this latter case, the quantity of hydrohalic acid present in the reaction medium obviously corresponds to the quantity necessary for the generation of the halogen, possibly increased by the concentration chosen for the free acid.

In practice, the purification can be conducted in the following manner. The impure terephthalic acid, suspended in water which may contain a hydrohalic acid, is brought to the selected temperature and pressure so as to ensure complete solution. A halogen, or a hydrohalic acid together with an agent capable of liberating halogen from this hydrohalic acid, is then introduced, or an oxidizing agent is introduced into the medium already containing the hydrohalic acid. The solution is agitated for a period from a few seconds to a few minutes, depending on circumstances, and is then cooled and decompressed if necessary. The terephthalic acid is isolated by filtration, copiously washed with water, and then dried. The acid obtained contains only very small traces of impurities. The quantity by weight of p-formyl-benzoic acid in particular is generally lower than 0.003% for a purified acid originating from an impure acid containing almost 1% thereof originally.

As the reaction time is very short, the purification can be effected in an efficient manner, using continuous processes.

The following examples illustrate the invention.

EXAMPLE 1

Into an autoclave with a capacity of 3.6 litres and made of a material resistant to the action of halogens, 100 g. of terephthalic acid containing 0.8% of p-formyl-benzoic acid and 2000 cc. of water containing 20 g. of hydrobromic acid are introduced. The pressure is adjusted to 6 bars with nitrogen, and the autoclave is then heated to 225° C., at which temperature the pressure is 30 bars. A solution is thus obtained, into which 9 g. of bromine in solution in 300 g. of water are injected in 5 minutes. The solution is cooled to 90° C. and the pressure reduced to atmospheric pressure. The crystals are separated by filtration, washed with hot water and then dried.

The purified terephthalic acid, obtained in a quantitative yield, does not contain more than 0.0012% of p-formyl-benzoic acid.

EXAMPLE 2

The procedure of Example 1 is used, but replacing the aqueous bromine solution by 600 g. of water containing 0.55% of chlorine. The terephthalic acid obtained under these conditions does not contain more than 0.0015% of p-formyl-benzoic acid. The yield of terephthalic acid is practically quantitative.

EXAMPLE 3

The operation is carried out as in Example 1, but replacing the bromine water by solution of a compound which reacts with the hydrobromic acid of the medium to form bromine in situ. Three tests were carried out on this basis, using respectively: (a) 100 g. of 3% hydrogen peroxide aqueous solution; (b) 100 g. of 2.4% aqueous nitric acid; and (c) 100 g. of an aqueous solution containing 3.55 g. of potassium permanganate. The purified terephthalic acid, obtained in each case in practically quantitative yield, has the following characteristics:

| Test: | Content of p-formyl-benzoic acid, percent |
|---|---|
| (a) | 0.0016 |
| (b) | 0.0023 |
| (c) | 0.0020 |

The whiteness of the terephthalic acid obtained in test (a) is determined by carrying out different measurements on the acid in the solid state, using a Zeiss "Elrepho" photocolorimeter. The results are expressed in accordance with the XYZ trichromatic representation system of the International Illumination Commission [Measurement of Colour, Wright, Edit. Hilger and Watts, 3rd edition, pages 96 to 127 (1964)]. In this way, the degree of whiteness and the dominant wavelength are expressed. Also calculated is the degree of yellowness defined by the formula $$\frac{Rx-Rz}{Ry}$$

in which $Rx$, $Ry$ and $Rz$ represent the coefficients of diffused reflection measured by the apparatus.

The results obtained are as follows:. degree of whiteness, 97.9%; dominant wavelength, 568 m$\mu$; and degree of yellowness, 0.04.

We claim:
1. Process for removing p-formyl-benzoic acid from terephthalic acid consisting in subjecting the said terephthalic acid, in aqueous solution under pressure at a temperature between 200° C. and 300° C., to the action of a halogen selected from the group consisting of chlorine and bromine.
2. Process according to claim 1 in which the solution also contains a hydrohalic acid selected from the group consisting of hydrochloric acid and hydrobromic acid.
3. Process according to claim 2, in which the halogen is generated in situ by oxidation of the hydrohalic acid.
4. Process according to claim 2 in which the amount of hydrohalic acid is 2 to 50% of the weight of the terephthalic acid.
5. Process according to claim 4 in which the amount of hydrohalic acid is 10 to 25% of the weight of the terephthalic acid.
6. Process according to claim 1 in which the proportion of halogen is 0.01 to 0.25 gram-atom per gram of p-formyl-benzoic acid in the terephthalic acid.
7. Process according to claim 6 in which the proportion of halogen is 0.025 to 0.125 gram-atom of halogen per gram of p-formyl-benzoic acid.
8. Process according to claim 1 in which the terephthalic acid solution has a concentration of 4% to 18% by weight and is at a temperature between 220° and 260° C.

References Cited

UNITED STATES PATENTS

| 3,102,137 | 8/1963 | Wise et al. | 260—525 |
| 3,171,856 | 3/1965 | Kurtz | 260—525 |

OTHER REFERENCES

Moeller: Inorganic Chemistry, 1952, p. 423.

R. S. WEISSBERG, Assistant Examiner

LORRAINE A. WEINBERGER, Primary Examiner